Patented Sept. 4, 1951

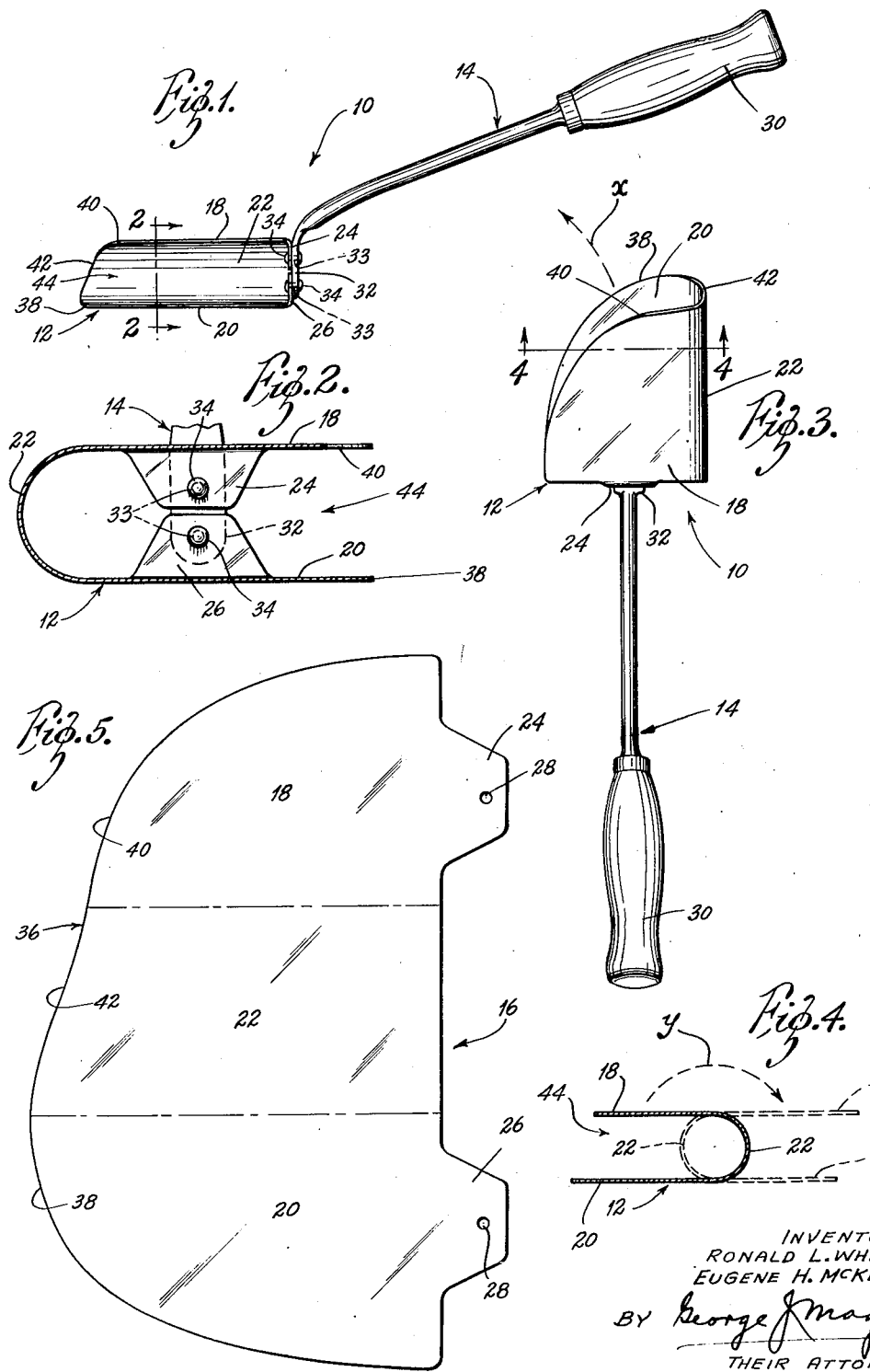

2,567,091

UNITED STATES PATENT OFFICE 2,567,091

CULINARY UTENSIL

Ronald L. Whitnah and Eugene H. McKeehan,
St. Louis, Mo.

Application October 3, 1947, Serial No. 777,670

4 Claims. (Cl. 294—7)

The present invention pertains to a culinary utensil particularly, though not exclusively, useful in frying eggs, pancakes, small steaks, onion slices and the like, which, after having been fried on one side, are to be turned over so that the unfried side may then contact the pan bottom or griddle.

Such turning operations with conventional implements require considerable skill, especially in the case of eggs, onion slices, hamburgers, and the like, which have a tendency to disintegrate in the process.

The novel device of the present invention is designed to expedite and facilitate turning operations of this kind, and to reduce the skill necessary for manipulating it.

The utensil is of simple construction, including a rigid U-shaped member formed from a single piece of material, and a handle riveted or otherwise secured thereto.

The principal object of the invention therefore is to provide a food turning implement which is easily manufactured, which is easy to manipulate successfully, and which so supports the food unit being turned that disintegration thereof is obviated.

The invention has other features and advantages, which will be referred to in the description to follow, reference being had also to the drawing which illustrates the preferred embodiment of the device.

In said drawing:

Fig. 1 is a side elevational view of a device constructed according to the present invention;

Fig. 2 is a transverse sectional view thereof taken on the line 2—2 of Fig. 1.

Fig. 3 is a top plan view of the device as it would appear to one using it;

Fig. 4 is a vertical transverse sectional view taken on the line 4—4 of Fig. 3; and Fig. 5 is a plan view of a thin sheet of material from which the U-shaped turning member of the device is formed.

In Figs. 1 and 3, the turning utensil is designated as a whole by the reference numeral 10. It includes a U-shaped element generaly indicated 12, and a handle element generally indicated 14.

The member 12 is preferably formed from a single sheet 16 of thin material, having the configuration shown in Fig. 5. It comprises a horizontally disposed top portion or wall 18, a similar bottom portion or wall 20, and a semicircular intermediate portion or connecting wall 22. Thus, the turner is U-shaped in transverse vertical section, the material forming the top, intermediate, and bottom portions thereof being identified by the same reference numerals, and separated by dot and dash lines in Fig. 5.

The top portion 18 is provided with a downwardly bent vertically disposed integral extension or ear member 24, and the bottom member with an upwardly bent vertically disposed integral extension or ear member 26. Each of these ears is preferably provided substantially centrally thereof with an aperture 28.

The handle 14 is angularly upwardly disposed relative the turner as seen particularly in Fig. 1. A suitable grip member 30 is secured thereto at its upper end, its opposite end terminating in a vertical portion 32 having a pair of spaced apertures 33 therein.

As shown especially in Fig. 2, rivets 34 pass through the aligned apertures 28 and 33 to secure the handle to the turner member. Although this manner of attaching the handle is preferable, all of said apertures may obviously be dispensed with, the handle in that case being welded or otherwise attached to the ears of the turner member. Obviously also, a single ear may be employed.

The irregularly curved or arcuate edge 36 of the blank 16 results in the turner member having the configuration best seen in Fig. 3, wherein it is noted that the forward edge 38 of the bottom portion 20 is considerably in advance of the forward edge 40 of the top portion 18 of said turner member, the purpose of which will be set forth hereinafter. There is also thus provided a semicircular edge 42 which constitutes a continuation of the edge 40, and extending forwardly and downwardly, merges into the edge 38 of the bottom member 20, the purpose of which will also appear.

In the device illustrated, the material from which the turner member is constructed is of uniform thickness throughout, but, if desirable, the edge 38 may be beveled to present a knife edge on the bottom wall 20.

The cavity 44 obtaining within the turner member between the semi-circular portion 22 and the top and bottom walls 18 and 20, respectively, is of a size to accommodate most of the food units ordinarily cooked in a frying pan, or on a gridle. Should a turner member of larger or smaller size be desired, it is only necessary to provide a blank 16 of increased or decreased area, as is understood.

For the purpose of describing the manner in which the device is used, it will be assumed that an egg has been desposited in a frying pan, or on a griddle. Assuming further, that the egg has now been sufficiently fried on its under side and is ready to be turned over, the cook slides the device along the pan bottom in the general direction of the broken line arrow indicated $x$, until the half fried egg rests upon the bottom 20 of the turner member.

At or near the end of this operation, the semi-circular portion 22 functions as a cushioning device for the egg, preventing injury thereto. In other words, should the cook slide the device farther than necessary, the incoming marginal portion of the egg will glide upwardly along the arcuate inner surface of the portion 22 without causing the egg to break.

Thereupon, the handle 14 is quickly rotated approximately one hundred and eighty degrees, as indicated by the broken line arrow $y$, in Fig. 4; whereupon the handle is elevated slightly at the grip end, and drawn toward the cook with the edge 40 in contact with the pan bottom. This causes the half fried egg to slide off the top 18 and onto the frying pan, with the unfried side of the egg now lowermost.

It should be apparent that during a turning operation, the semi-circular portion 22, and particularly, the semi-circular edge 42 of the turning member, greatly facilitate rotation of the device.

It should further be apparent that the deposit of the half fried egg is facilitated by reason of the edge 40 of the wall 18 being located rearwardly of the edge 38. This arrangement permits that portion of the egg remote from the handle to contact the pan immediately after the device has been turned, so that sliding the device toward the cook, with the edge 40 in contact with the pan bottom, as mentioned, insures a successful turning operation. Obviously the device may thereupon be used to remove the egg from the pan.

Construction of the device, as illustrated and described, is ideal from a manufacturing standpoint, but it may obviously be modified without departure from the spirit of the invention. For example, instead of being arcuate, the wall 22 may be perpendicular to the top and bottom walls. However, the arcuate form greatly facilitates cleaning of the device.

What is claimed is:

1. A culinary utensil comprising in combination: a U-shaped turner member including a horizontally disposed top wall, a similarly disposed bottom wall and a semi-circular connecting wall, the forward edge of said bottom wall being considerably in advance of the forward edge of said top wall, an integral downwardly bent extension or ear on said top wall, an integral upwardly bent extension or ear on said bottom wall, an angularly upwardly extending handle member terminating at one end in a vertically disposed portion, and means whereby the latter is permanently attached to said ears.

2. A device of the character described, comprising in combination, a U-shaped food turning element provided with horizontally disposed top and bottom walls joined by an arcuate wall to provide a cavity, a downwardly bent vertically disposed extension provided with an aperture included in said top wall and at one end thereof, an upwardly bent vertically disposed extension provided with an aperture included in said bottom wall and at one end thereof, an upwardly inclined handle member terminating at its lower end in a vertically disposed depending portion having a pair of spaced apertures therein, and fastening elements passing through said apertures and the apertures in said extensions to secure said turning element to the handle.

3. In a food turning implement of the type described, a U-shaped member formed from a single blank of thin material, said member including an upper horizontal wall portion, a lower horizontal wall portion, an arcuate intermediate wall portion integral with and joining said upper and lower wall portions, and a continuous irregularly curved marginal edge along one side and the front of the top wall, the front of the intermediate wall, and the front and one side of the bottom wall.

4. In a turning implement of the type described, a U-shaped member formed from a single blank of thin material, said member including in combination: an upper horizontal wall portion, a lower horizontal wall portion, an arcuate intermediate wall portion integral with and joining said upper and lower wall portions, a continuous irregularly curved marginal edge along one side and the front of the top wall, the front of the intermediate wall, that portion of said edge along the front of the bottom wall extending forwardly beyond that portion of said edge along the front of the top wall, and the front and one side of the bottom wall, and means for securing said turner member to one end portion of an upwardly inclined handle member.

RONALD L. WHITNAH.
EUGENE H. McKEEHAN.

REFERENCES CITED

The following references are of record in the file of this patent:

UNITED STATES PATENTS

| Number | Name | Date |
| --- | --- | --- |
| 669,219 | Holman | Mar. 5, 1901 |
| 993,560 | Skyum | May 30, 1911 |
| 1,130,234 | Wrobel | Mar. 2, 1915 |
| 2,299,418 | Thomas | Oct. 20, 1942 |

FOREIGN PATENTS

| Number | Country | Date |
| --- | --- | --- |
| 9,868 | Great Britain | Oct. 8, 1914 |